United States Patent
Larson

(10) Patent No.: US 6,310,671 B1
(45) Date of Patent: *Oct. 30, 2001

(54) POLARIZATION SENSITIVE SCATTERING ELEMENT

(75) Inventor: Brent D. Larson, Cave Creek, AZ (US)

(73) Assignee: Honeywell, Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/052,821

(22) Filed: Mar. 30, 1998

Related U.S. Application Data

(63) Continuation of application No. 08/418,981, filed on Apr. 7, 1995, now Pat. No. 5,751,388.

(51) Int. Cl.[7] .................... G02F 1/1335; G02F 1/1333
(52) U.S. Cl. ........................... 349/96; 349/86; 349/87; 359/63
(58) Field of Search .................. 349/86, 87, 96, 349/62, 67; 359/37, 63, 494, 487, 49, 51–53; 353/20

(56) References Cited

U.S. PATENT DOCUMENTS

| | | |
|---|---|---|
| 2,123,902 | 7/1938 | Land . |
| 2,604,817 | 7/1952 | Schupp ............................ 350/406 |
| 2,803,552 | 8/1957 | Stedman .......................... 106/13 |
| 3,022,178 | 2/1962 | Park ................................ 106/13 |
| 3,075,228 | 1/1963 | Elias ............................... 15/104.93 |
| 3,124,639 | 3/1964 | Kahn ............................... 350/395 |
| 3,212,909 | 10/1965 | Leigh .............................. 106/13 |
| 3,213,753 | 10/1965 | Rogers ............................ 88/65 |

(List continued on next page.)

FOREIGN PATENT DOCUMENTS

| | | | |
|---|---|---|---|
| 3642897A | 6/1988 | (DE) | ............................ G02B/1/00 |
| 4121861A1 | 7/1991 | (DE) | ............................ G02B/5/30 |
| 0399506A2 | 11/1990 | (EP) | ............................ G02F/1/1335 |
| 0469732A2 | 7/1991 | (EP) | . |
| 0488544B1 | 11/1991 | (EP) | ............................ B02B/5/30 |
| 0506176B1 | 3/1992 | (EP) | ............................ C09K/19/54 |
| 0514223A1 | 5/1992 | (EP) | ............................ G02B/5/08 |
| 0506176A1 | 9/1992 | (EP) | ............................ C09K/19/54 |

(List continued on next page.)

OTHER PUBLICATIONS

Research Disclosure, No. 351, Jul. 1, 1993, pp. 452, 453 "Polarizer", Anonymous.
Liquid Crystals, vol. 15, No. 3, Sep. 1, 1993, pp. 395–407 "Optical Properties of Stretched Polymer Dispersed Liquid Crystal Films", Aphonin, et al.
SID 92 Digest, pp. 427–429, 23.3: "Retroreflecting Sheet Polarizer", Weber.
Molecular Engineering, 1992, pp. 305–310, "Elongated Films of Polymer–Dispersed Liquid Crystals as Scattering Polarizers", Zyryanov, et al.

(List continued on next page.)

*Primary Examiner*—William L. Sikes
*Assistant Examiner*—Tarifur R. Chowdhury
(74) *Attorney, Agent, or Firm*—Loria B. Yeadon

(57) ABSTRACT

A polarization-sensitive scattering element (PSSE) that acts to effectively separate light of different polarizations. The PSSE is a microstructural composite of material domains having differing birefringence. The PSSE has a first scattering distribution for light rays of a first polarization and a second scattering distribution for light rays of a second polarization. The first scattering distribution is such that the majority of the light rays of the first polarization are randomly backscattered. The second scattering distribution is such that the majority of the light rays of the second polarization are substantially transmitted. The PSSE provides a means for recapturing light energy which would otherwise be lost in display devices, while reducing degradation and heat build-up due to light absorption.

18 Claims, 12 Drawing Sheets

U.S. PATENT DOCUMENTS

| | | | |
|---|---|---|---|
| 3,438,691 | 4/1969 | Makas | 350/157 |
| 3,480,502 | 11/1969 | Schrenk | 156/271 |
| 3,522,985 | 8/1970 | Rogers . | |
| 3,565,985 | 2/1971 | Schrenk | 264/171 |
| 3,566,099 | 2/1971 | Makas | 240/9.5 |
| 3,585,255 | 6/1971 | Sevenich | 260/873 |
| 3,610,729 | 10/1971 | Rogers | 350/157 |
| 3,653,138 | 4/1972 | Cooper | 40/130 R |
| 3,711,176 | 1/1973 | Alfrey | 350/1 |
| 3,759,647 | 9/1973 | Schrenk | 425/131 |
| 3,772,128 | 11/1973 | Kahn | 156/555 |
| 3,819,522 | 6/1974 | Zmoda | 252/89 |
| 3,847,585 | 11/1974 | Chisholm | 65/99 |
| 3,860,036 | 1/1975 | Newman | 138/45 |
| 3,897,356 | 7/1975 | Pociluyko | 252/91 |
| 4,025,688 | 5/1977 | Nagy | 428/350 |
| 4,249,011 | 2/1981 | Wendling | 548/312 |
| 4,268,127 | 5/1981 | Oshima | 350/337 |
| 4,281,084 | 7/1981 | Fellmann | 525/309 |
| 4,310,584 | 1/1982 | Cooper | 428/212 |
| 4,446,305 | 5/1984 | Rogers | 528/348 |
| 4,478,909 | 10/1984 | Taniguchi | 428/331 |
| 4,520,189 | 5/1985 | Rogers | 528/331 |
| 4,521,588 | 6/1985 | Rogers | 528/363 |
| 4,525,413 | 6/1985 | Rogers | 428/212 |
| 4,680,353 | 7/1987 | Ishihara | 526/160 |
| 4,688,897 | 8/1987 | Grinberg et al. | 350/336 |
| 4,688,900 | 8/1987 | Doane | 350/347 V |
| 4,717,225 | 1/1988 | Feth | 350/96.33 |
| 4,720,426 | 1/1988 | Englert | 428/344 |
| 4,796,160 | 1/1989 | Kahn | 362/19 |
| 4,871,784 | 10/1989 | Otonari | 521/138 |
| 5,058,997 | 10/1991 | Dickerson et al. | 359/59 |
| 5,077,121 | 12/1991 | Harrison | 428/213 |
| 5,088,807 | 2/1992 | Waters | 359/94 |
| 5,094,788 | 3/1992 | Schrenk | 264/171 |
| 5,094,793 | 3/1992 | Schrenk | 264/171 |
| 5,103,337 | 4/1992 | Schrenk | 359/359 |
| 5,122,887 | 6/1992 | Mathewson | 359/53 |
| 5,122,905 | 6/1992 | Wheatley | 359/586 |
| 5,122,906 | 6/1992 | Wheatley | 359/586 |
| 5,126,880 | 6/1992 | Wheately | 359/587 |
| 5,138,474 | 8/1992 | Arakawa | 359/73 |
| 5,149,578 | 9/1992 | Wheatley | 428/213 |
| 5,157,526 | 10/1992 | Kondo et al. | 359/63 |
| 5,166,817 | 11/1992 | Ota | 359/73 |
| 5,175,030 | 12/1992 | Lu | 428/30 |
| 5,184,881 | 2/1993 | Karpen | 362/1 |
| 5,188,760 | 2/1993 | Hikmet | 252/299 |
| 5,202,938 | 4/1993 | Man | 385/11 |
| 5,211,878 | 5/1993 | Reiffenrath | 252/299 |
| 5,217,794 | 6/1993 | Schrenk | 428/220 |
| 5,221,982 | 6/1993 | Faris | 359/93 |
| 5,222,795 | 6/1993 | Hed | 362/32 |
| 5,233,465 | 8/1993 | Wheatley | 359/359 |
| 5,235,443 | 8/1993 | Barnik | 359/37 |
| 5,238,738 | 8/1993 | Miller | 428/333 |
| 5,245,456 | 9/1993 | Yoshimi | 359/73 |
| 5,262,894 | 11/1993 | Wheatley | 359/586 |
| 5,268,225 | 12/1993 | Isayev | 428/294 |
| 5,269,995 | 12/1993 | Ramanathan | 264/171 |
| 5,278,694 | 1/1994 | Wheately | 359/359 |
| 5,294,657 | 3/1994 | Melendy | 524/270 |
| 5,301,046 | 4/1994 | Konuma | 359/51 |
| 5,316,703 | 5/1994 | Schrenk | 264/1.3 |
| 5,319,478 | 6/1994 | Funfschilling | 359/53 |
| 5,337,174 | 8/1994 | Wada | 359/73 |
| 5,359,498 | 10/1994 | Karpen | 362/19 |
| 5,389,324 | 2/1995 | Lewis | 264/171 |
| 5,394,498 | 2/1995 | Hinterlong | 385/115 |
| 5,485,354 | 1/1996 | Ciupke et al. | 362/31 |
| 5,721,603 | 2/1998 | De Vaan | 349/194 |
| 5,751,388 * | 5/1998 | Larson | 349/96 |

FOREIGN PATENT DOCUMENTS

| | | | |
|---|---|---|---|
| 0591055B1 | 9/1993 | (EP) | B32B/7/02 |
| 2592284A2 | 9/1993 | (EP) | B32B/7/02 |
| 0597261B1 | 10/1993 | (EP) | G02F/1/1335 |
| 0573905A1 | 12/1993 | (EP) | G02B/27/28 |
| 0627638A1 | 5/1994 | (EP) | G02B/5/02 |
| 597261A1 | 5/1994 | (EP) | G02F/1/335 |
| 63-168626 | 7/1988 | (JP) | G02F/1/133 |
| 1-189627 | 7/1989 | (JP) | G02F/1/133 |
| 1-265206 | 10/1989 | (JP) | G02B/5/30 |
| 1-277203 | 11/1989 | (JP) | G02B/5/30 |
| 2-154205 | 6/1990 | (JP) | G02B/5/30 |
| 2-265634 | 10/1990 | (JP) | G02B/5/30 |
| 2-308106 | 12/1990 | (JP) | G02B/5/30 |
| 4-127120 | 4/1992 | (JP) | G02B/27/28 |
| 4-172305 | 6/1992 | (JP) | G02B/5/30 |
| 4-240804 | 8/1992 | (JP) | G02B/5/30 |
| 5-45567 | 3/1993 | (JP) | C08J/07/04 |
| 05-086542 | 4/1993 | (JP) | G02F/1/13 |
| 6-324333 | 1/1994 | (JP) | G02F/1/1335 |
| 8-76114/1996 | 9/1994 | (JP) | G02F/1/1335 |
| 90/04805 | 5/1990 | (WO) | G02F/1/13 |
| WO 94/29765 | 5/1994 | (WO) | G02F/1/1335 |
| WO 95/17303 | 12/1994 | (WO) | B32B/7/02 |
| WO 95/17691 | 12/1994 | (WO) | G02B/5/30 |
| WO 95/17692 | 12/1994 | (WO) | G02B/5/30 |
| WO 95/27919 | 4/1995 | (WO) | G02B/27/28 |
| 95/17699 | 6/1995 | (WO) | G02F/1/1335 |
| WO 96/19347 | 12/1995 | (WO) | B32B/7/02 |
| WO 96/31794 * | 10/1996 | (WO) . | |
| WO 97/32222 | 9/1997 | (WO) | G02B/1/04 |
| WO 97/32223 | 9/1997 | (WO) | G02B/1/04 |
| WO 97/32224 | 9/1997 | (WO) | G02B/5/30 |
| WO 97/32225 | 9/1997 | (WO) | G02B/5/30 |
| WO 97/32226 | 9/1997 | (WO) | G02B/5/30 |
| WO 97/32227 | 9/1997 | (WO) | G02B/5/30 |
| WO 97/32230 | 9/1997 | (WO) | G02B/6/12 |

OTHER PUBLICATIONS

Japan Display, 1992, pp. 259–262, "Directional Diffuser Lens Array for Backlit LCDs", McCartney, et al.

SID 90 Digest, pp. 324–326, "Novel Polarized Liquid–Crystal Color Projection and New TN–LCD Operating Modes", Schadt, et al.

SID 90 Digest, pp. 110–113, "Polarizing Color Filters Made From Cholesteric LC Silicones", Maurer, et al.

Optical Society of America, Reprinted from Journal of the Optical Society of America, vol. 41(12), 957–963 (Dec. 1951), "Some Aspects of Sheet Polarizers", Land.

"Right and Left Circular Polarizing Colorfilters Made for Crosslinkable Cholesteric LC–Silicones", Haberle, N., et al., pp. 57–59.

"Color LCDs : Technical Developments", Uchida, pp. 202–205.

Japanese Journal of Applied Physics, vol. 29, No. 10, pp. 1974–1984, (Oct. 1990), "New Liquid Crystal Polarized Color Projection Principle".

* cited by examiner

POLARIZATION SENSITIVE SCATTERING ELEMENT

This application is a continuation of Ser. No. 08/418,981 Apr. 7, 1995, now U.S. Pat. No. 5,751,388.

FIELD OF THE INVENTION

This invention relates to the field of polarized displays and more particularly to displays including LCDs, ferroelectric displays, projection displays and other similar illuminated display devices and systems.

BACKGROUND OF THE INVENTION

The performance potential and flexibility of polarized displays, especially those utilizing the electro-optic properties of liquid crystalline materials, has led to a dramatic growth in the use of these displays for a wide variety of applications. Liquid crystal displays (LCDs) offer the full range from extremely low cost and low power performance (e.g. wristwatch displays) to very high performance and high brightness (e.g. AMLCDs for avionics applications, computer monitors and HDTV projectors). Much of this flexibility comes from the light valve nature of these devices, in that the imaging mechanism is decoupled from the light generation mechanism. While this is a tremendous advantage, it is often necessary to trade performance in certain categories such as luminance capability or light source power consumption in order to maximize image quality or affordability. This reduced optical efficiency can also lead to performance restrictions under high illumination due to heating or fading of the light-absorbing mechanisms commonly used in the displays.

In portable display applications such as backlit laptop computer monitors or other instrument displays, battery life is greatly influenced by the power requirements of the display backlight. Thus, functionality must be compromised to minimize size, weight and cost. Avionics displays and other high performance systems demand high luminance but yet place restrictions on power consumption due to thermal and reliability constraints. Projection displays are subject to extremely high illumination levels, and both heating and reliability must be managed. Head mounted displays utilizing polarized fight valves are particularly sensitive to power requirements, as the temperature of the display and backlight must be maintained at acceptable levels.

Prior art displays suffer from low efficiency, poor luminance uniformity, insufficient luminance and excessive power consumption which generates unacceptably high levels of heat in and around the display. Prior art displays also exhibit a non-optimal environmental range due to dissipation of energy in temperature sensitive components. Backlight assemblies are often excessively large in order to improve the uniformity and efficiency of the system.

Several areas for efficiency improvement are readily identified. Considerable effort has gone into improving the efficiency of the light source (e.g. fluorescent lamps) and optimizing the reflectivity and light distribution of backlight cavities to provide a spatially uniform, high luminance light source behind the display. Pixel aperture ratios are made as high as the particular LCD approach and fabrication method will economically allow. Where color filters are used, these materials have been optimized to provide a compromise between efficiency and color gamut. Reflective color filters have been proposed for returning unused spectral components to a backlight cavity. When allowed by the display requirements, some improvement can also be obtained by constricting the range of illumination angles for the displays via directional techniques.

Even with this prior art optimization, lamp power levels must be undesirably high to achieve the desired luminance. When fluorescent lamps are operated at sufficiently high power levels to provide a high degree of brightness for a cockpit environment, for example, the excess heat generated may damage the display. To avoid such damage, this excess heat must be dissipated. Typically, heat dissipation is accomplished by directing an air stream to impinge upon the components in the display. Unfortunately, the cockpit environment contains dirt and other impurities which are also carried into the display with the impinging air, if such forced air is even available. Presently available LCD displays cannot tolerate the influx of dirt and are soon too dim and dirty to operate effectively.

Another drawback of increasing the power to a fluorescent lamp is that the longevity of the lamp decreases dramatically as ever higher levels of surface luminance are demanded. The result is that aging is accelerated which may cause abrupt failure in short periods of time when operating limitations are exceeded.

Considerable emphasis has also been placed on optimizing the polarizers for these displays. By improving the pass-axis transmittance (approaching the theoretical limit of 50%), the power requirements have been reduced, but the majority of the available light is still absorbed, constraining the efficiency and leading to polarizer reliability issues in high throughput systems as well as potential image quality concerns.

A number of polarization schemes have been proposed for recapturing a portion of the otherwise lost light and reducing heating in projection display systems. These include the use of Brewster angle reflections, thin film polarizers, birefringent crystal polarizers and cholesteric circular polarizers. While somewhat effective, these prior art approaches are very constrained in terms of illumination or viewing angle, with several having significant wavelength dependence as well. Many of these add considerable complexity, size or cost to the projection system, and are impractical on direct view displays. None of these prior art solutions are readily applicable to high performance direct view systems requiring wide viewing angle performance.

Also taught in the prior art (U.S. Pat. No. 4,688,897) is die replacement of the rear pixel electrode in an LCD with a wire grid polarizer for improving the effective resolution of twisted nematic reflective displays, although this reference falls short of applying the reflective polarizing element for polarization conversion and recapture. The advantages which can be gained by the approach, as embodied in the prior art, are rather limited. It allows, in principle, the mirror in a reflective LCD to be placed between the LC material and the substrate, thus allowing the TN mode to be used in reflective mode with a minimum of parallax problems. While this approach has been proposed as a transflective configuration as well, using the wire grid polarizer instead of the partially-silvered mirror or comparable element, the prior art does not provide means for maintaining high contrast over normal lighting configurations for transflective displays. This is because the display contrast in the backlit mode is in the opposite sense of that for ambient lighting. As a result, there will be a sizable range of ambient lighting conditions in which the two sources of light will cancel each other and the display will be unreadable. A further disadvantage of the prior art is that achieving a diffusely reflective polarizer in this manner is not at all straightforward, and hence the reflective mode is most applicable to specular, projection type systems.

SUMMARY OF THE INVENTION

It is, therefore, an object of the present invention to improve the optical efficiency of polarized displays, especially direct view liquid crystal displays (LCDs) and projection LCDs.

It is a further object of the present invention to provide this efficiency increase while retaining wide viewing angle capability and minimizing the introduction of chromatic shifts or spatial artifacts.

It is a further object of the present invention to reduce the absorption of light by polarized displays, minimizing heating of the displays and degradation of the display polarizers.

It is a further object of the present invention to provide an LCD having increased display brightness.

It is yet a further object of the present invention to reduce the power requirements for LCD backlight systems.

It is yet a further object of the present invention to improve display backlight uniformity without sacrificing performance in other areas.

It is still a further object of the present invention to achieve these objects in a cost-effective and compact manner with only nominal redesign of the display system in most cases, in a way compatible with a wide variety of illumination sources and without the need for modification of the light valves.

These and other objects are provided by the present invention by managing the absorption of optical energy within the polarized display system. In particular, the losses and side-effects associated with polarizing the light are reduced or redistributed via judicious use of specialized non-absorbing polarization mechanisms, especially microstructural composites of materials having different birefringence, hereafter referred to as polarization sensitive scattering elements (PSSE).

The efficiency of diffusely backlit displays is increased by selectively returning the undesired polarization to a reflecting cavity for subsequent use, or alternately by selectively coupling the desired polarization out of a light cavity. Uniformity and efficiency are also increased by adjusting other cavity and display components to take full advantage of the PSSE configuration(s).

The efficiency of projection displays is increased by converting one polarization to the orthogonal polarization, and also by supplementing or eliminating the conventional absorbing polarizers with higher efficiency non-absorbing mechanisms. This improved efficiency is applied as required to reduce power, increase maximum brightness, or enable other performance improvements.

Full viewing angle compatibility is maintained, in the wide-angle diffuse backlight case, by matching the symmetry of the PSSE with the symmetry of the conventional absorbing polarizer. Freedom from chromatic shifts with changing angle is provided by avoiding coherent structures having periodicitles in the vicinity of the wavelength of visible light.

The absorption of light by the display is minimized by utilizing the PSSE to polarize or pre-polarize the light normally polarized by a conventional polarizer.

Cost-effectiveness is achieved by adopting one of a number of compatible PSSE structures and variations thereof, in many cases as a simple add-in or replacement element for conventional approaches.

These PSSE configurations are applied in a number of novel and non-obvious embodiments to enhance the performance of backlit direct view displays, reflective displays, and projection displays.

DESCRIPTION OF THE PREFERRED EMBODIMENTS

The present invention applies the novel polarization control properties of non-absorbing polarizer elements, especially polarization sensitive scattering elements (PSSEs), to significantly enhance polarized display performance in ways not previously possible or envisioned. Embodiments are described herein for each of these display system types to convey the versatility of this invention. It will be clear from the embodiments presented that the scope of the invention is not limited to the particular configurations shown.

Figure 1:
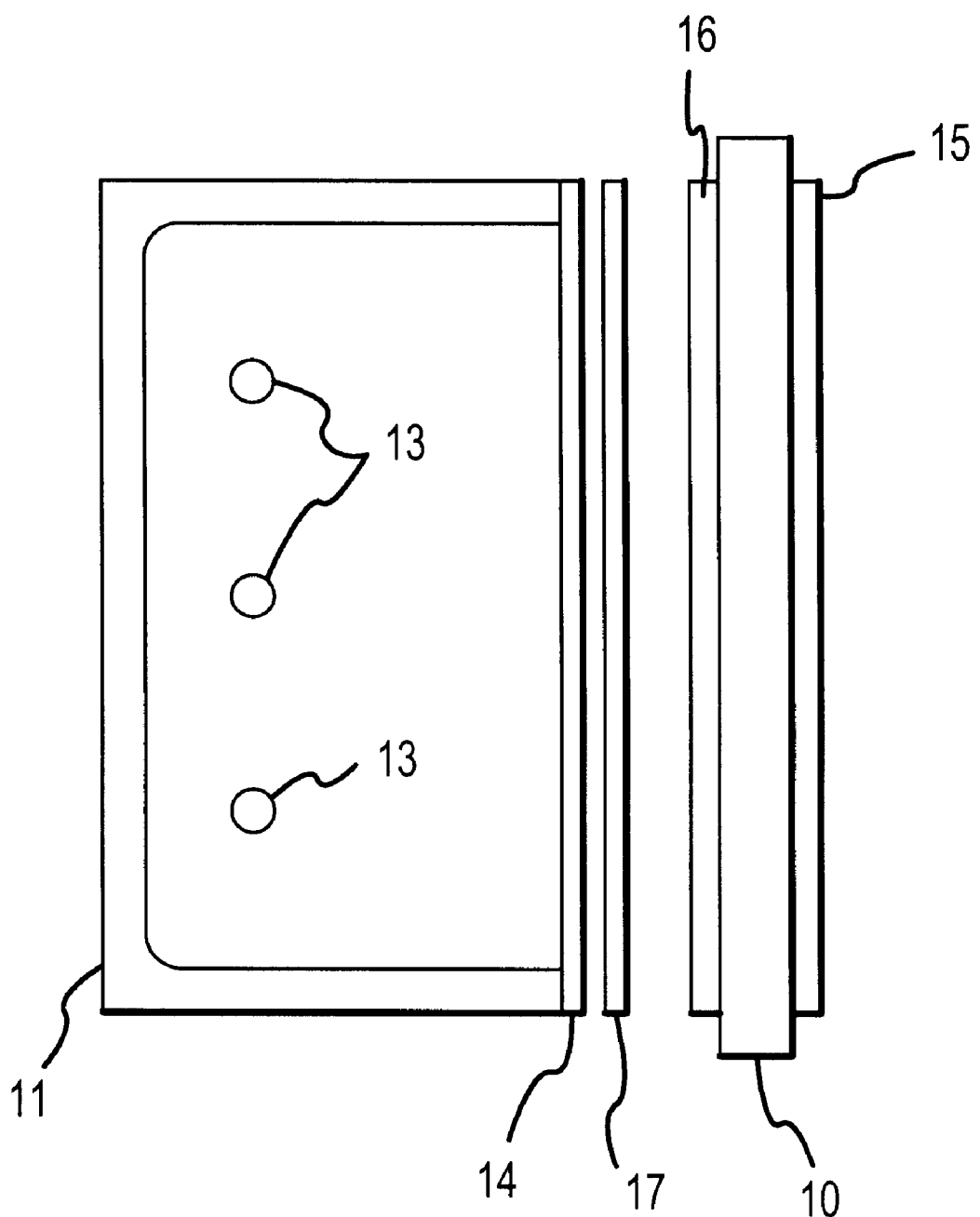
FIG. 1 shows the first embodiment of the invention.

The basic concept is best illustrated by a first preferred embodiment, depicted in FIG. 1. The first embodiment includes a light source 13 located within a diffusely reflecting cavity 11. Light from the light source passes through diffuser 14 as well as polarization-sensitive scattering element (PSSE) 17. Light from the PSSE 17 then passes to the LCD panel portion of the display which is comprised of the LCD panel 10, rear polarizer 16 and front polarizer 15. In the present embodiment the PSSE is utilized to prepolarize the light prior to reaching the rear display polarizer. Other embodiments build upon these principles, and are well introduced by this first example. Polarized display panel 10 is, for example, a monochrome or full color AMLCD, STNLCD, ferroelectric LCD or other light modulator functioning by manipulating the polarization of the incoming light between rear and front polarizers 16 and 15. The backlight is in the form of a diffusely reflective cavity 11 consisting of white walls and containing fluorescent lamp(s) 13. The unique attribute of this embodiment is the addition of the polarization-sensitive scattering element (PSSE) 17. This is a flat, thin optical element which in this embodiment serves as a non-absorbing pre-polarizer. The PSSE transmits the majority of the light polarized along one optical axis and returns the majority of the light having the orthogonal polarization to the backlight cavity, where its polarization state is changed, giving it another opportunity to contribute to the output of the first polarization. PSSE structures having these properties are described below.

It is beneficial to set up a simple model for understanding this configuration. It is readily shown that under the assumption of uniform intensity in the backlight cavity, the output intensity $I_{out}$ (e.g. watts/cm$^2$, footlamberts, candelas/m$^2$, depending upon the choice of units and weighting functions) is approximately given by $$I_{out} = \frac{P_{in} \cdot T_{port}}{\lambda_{box} + (1 - R_{port}) \cdot A_{port}} \quad (1)$$

where $P_{in}$ is the input optical power (in the appropriate form), $T_{port}$ is the transmittance of the element(s) covering the port of the cavity (usually the display panel), $R_{port}$ is the reflectance of the element(s) covering the port, $A_{port}$ is the area of the port, and $\zeta_{box}$ is the equivalent black loss area of the rest of the cavity. The magnitude of $\zeta_{box}$ as compared with $A_{port}$ provides a useful characterization as to the lossiness of the backlight cavity. $\zeta_{box}$ is the weighted sum of all surface areas in the cavity times their respective loss (absorptance plus transmittance, if the transmitted light leaves the cavity), and hence represents the area of an equivalent black spot if all of the cavity losses were combined into one region.

The diffuser and PSSE may of course be considered as either belonging to the cavity or as covering the port with identical results. In order to do this, it is necessary to recognize that losses are effectively further weighted by the ratio of the local intensity at that spot to the intensity incident on the port, thus accounting for both attenuation by the diffuser and for inevitable non-uniformity within most practical cavities.

Let us assume, for example, that the transmittance of the panel is 3% and has 0% reflectance, and that the diffuser is considered part of the cavity but a PSSE between the diffuser and panel contributes to the port (panel) parameters in the equation. Taking the PSSE to have the form of a backscattering polarizer (pass axis transmittance of $T_{pass}$ and total reflectance of $R_{total}$) yields a direct improvement of $$\frac{I_{with}}{I_{without}} = \frac{T_{pass}}{1 - \dfrac{R_{total}}{1 + \dfrac{\lambda_{box}}{A_{port}}}} \quad (2)$$

Figure 2:
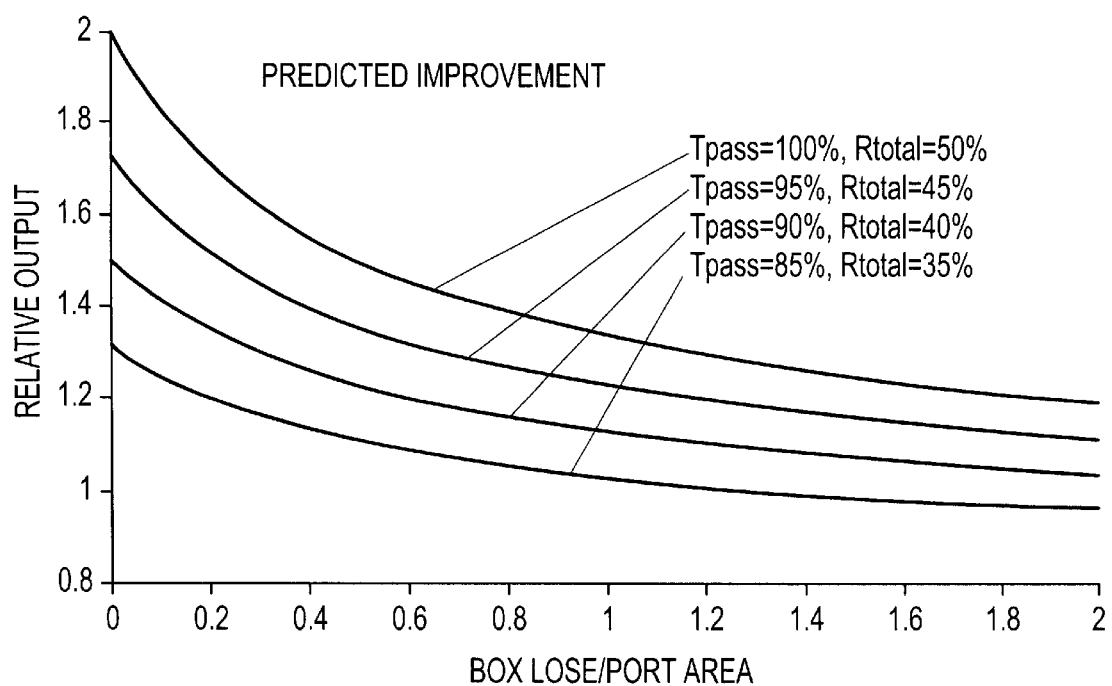
FIG. 2 shows predicted improvements resulting from the first embodiment of the invention.

FIG. 2 shows this relationship for several pre-polarizer performance levels. For ideal components, the potential exists for a 100% improvement. We have fabricated PSSEs (described below) having $T_{pass}$ and $R_{total}$ in the neighborhood of 90% and 45% respectively, and have indeed measured pass-axis output increases approaching 40% for very low loss cavity designs, without adversely affecting the chromatic or angular uniformity of the light. This confirms the model validity and demonstrates for the first time a viable method for recapturing a significant portion of the polarization normally lost in a wide-viewing angle direct view display system.

Key to making this approach viable is the application of a non-absorbing polarizing mechanism with suitable properties. The ideal properties include very low absorption, very high pass axis transmittance, significant total reflectance, minimal angular dependence, spectrally broadband, comparable optical axis symmetry with a parallel-aligned absorbing polarizer, and freedom from other artifacts. In addition, the pre-polarizer should have the potential to be thin, large area, lightweight, robust, and low cost. Polarizers described in the prior art for use in polarization conversion schemes do not meet this extensive list of requirements.

As part of the present invention, a class of polarizing structures is presented which does meet the requirements listed above, enabling the efficiency enhancements and other performance improvement methods of the present invention to be implemented in an effective and practical manner. The new polarizers and applications described herein are achieved using polarization sensitive scattering elements, fabricated in the form of microstructural composites of materials having differences in birefringence. Materials having static scattering properties which are polarization-dependent have been known for decades but have received little attention. Land, in 1951, described a suspension of aligned birefringent crystals embedded in a polymer matrix as being diffuse for one polarization and clear for the other. U.S. Pat. No. 4,685,771 describes a polymer dispersed liquid crystal (PDLC) structure, and others have reported related polymer network LC structures with similar polarization sensitive scattering properties.

It should be pointed out that the presence of polarization sensitive scattering properties is not by itself sufficient to provide polarization or even pre-polarization in the display. Most PSSE structures are by nature forward scattering, and exhibit some degree of scattering for both polarization axes, although with difference in magnitude. It is necessary to somehow physically separate or exclude one of the polarizations with respect to the other. In the embodiments of this invention, this is done by combinations of three different mechanisms. These are highly multiple scattering, total internal reflection (TIR) and aperture effects (e.g. spatial filtration).

FIGS. 3a–h show a variety of PSSE embodiments useful as part of the present invention. While some of the PSSE structures or fabrication methods described herein are known, others are presented here for the first time. Additional methods and related structures are possible without deviating from the spirit of this invention.

Figure 3A:
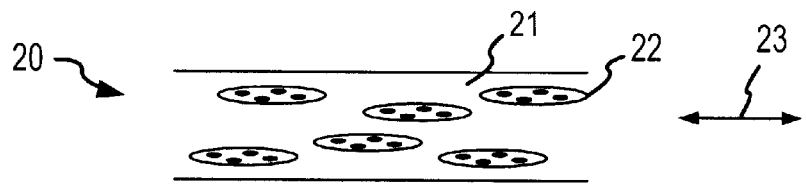
FIGS. 3a–h show exploded views of several candidate elements of the invention.

PSSE 20 in FIG. 3a is a uniaxial homogeneously-aligned PDLC structure 20. LC droplets 22 are formed, embedded in a polymer matrix 21, using methods well known in the art These include polymerization induced phase separation and emulsification/encapsulation methods, and can also take the form of a polymer network/LC structure in which the "droplets" are not distinct but rather interconnected. In these structures, the LC is aligned due to the minimum free energy state associated with the elongation of the droplet or network. The elongation is induced, for example, by physically stretlhig the film along axis 23 alter the droplets are formed and with the polymer matrix in a thermally softened state. The refractive indices of the LC are selected such that either the ordinary or extraordinary index of the LC matches the corresponding index of the polymer, and such that the other index is highly mismatched. It should be noted that the polymer may also be birefringent, especially if it is stretched, but that the birefringence of the two materials should be different in order to ensure a mismatch in scattering efficiency for the two polarization axes.

This stretched PDLC is the structure discussed earlier with regards to the demonstration of an effective polarization recapture method for wide angle direct view displays. A suitable, high birefringence LC was emulsified in a PVA/water solution. A film was produced by coating and drying the emulsified solution on a substrate. The resulting film was stretched under applied heat and subsequently laminated between supporting substrates to maintain the alignment geometry.

Using typical PDLC film coating thicknesses results in relatively low backscatter, especially after the high stretching ratio used in order to maximize the alignment of the LC. To drive the optical parameters toward that of an effective polarizing element for the configuration in FIG. 1, a highly multiple-scattering design was implemented. The extraordinary refractive index mismatch was maximized, and the ordinary index mismatch was minimized while still maintaining an acceptable useful temperature range. The thickness of the stretched film was increased until residual scattering by the relatively well matched ordinary axes began to reduce the pass-axis (low-scattering) transmission in the presence of the diffuse backlight cavity. To minimize this loss in pass-axis transmittance further, a high stretching ratio was used in order to maximize the alignment of the LC. Backscatter was further enhanced by maintaining an air gap after the PSSE substrate sufficient to support TIR of many of the forward-scattered extraordinary rays. After internal reflection, these rays are scattered again by the PSSE layer, with a significant probability of being scattered out of the assembly and back toward the source after a single TIR.

Photopic measurements with a diffuse integrating sphere light source have shown early prototypes to transmit (measured on-axis) approximately 90% and 30% of the pass-axis and rejection-axis polarization components, respectively. Typical total reflectance was measured to be approximately 45% from the same elements. As indicated above, this was adequate to yield improvements approaching 40% in very low loss cavities. Tests using these early prototypes with less optimized cavity designs resulted in slightly lower but still significant gains.

These data also show that in addition to the efficiency enhancement, the backscattering PSSE thus demonstrated reduces the optical energy absorbed by the rear absorbing polarizer by approximately a factor of 3, greatly reducing the optical heating of the display and any associated effects on image quality or reliability.

Freedom from color shifts is provided because the microstructure is not coherently periodic. The color shift resulting from insertion of the element into the display system was small, although transmittance was slightly lower in the deep blue wavelengths. More importantly, though, virtually no color shift and only minimal pass-axis transmittance variation were observed over the full viewing angle range of ±60° and beyond when the polarizing effects of surface reflections were eliminated with suitable antireflection coatings. This readily confirms the utility of this invention for efficiency enhancement in the difficult wide viewing angle applications, unlike prior art polarization conversion schemes limited to highly directional illumination.

This wide viewing angle compatibility is expected in the case described, since the wavelength dependence of the scattering is smoothly varying and the optical axis symmetry is identical to that of the corresponding polarizer on the rear of the LCD panel, provided that the polymer matrix index matches the ordinary index of the LC in the aligned droplets.

Figure 3B:
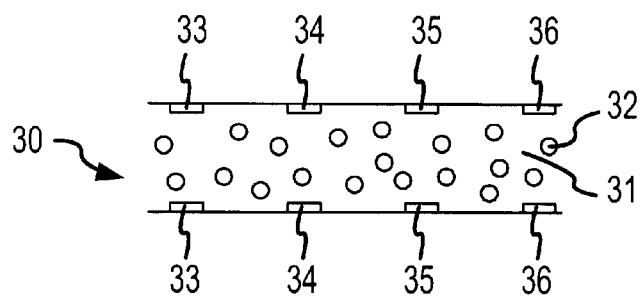
Figure 3C:
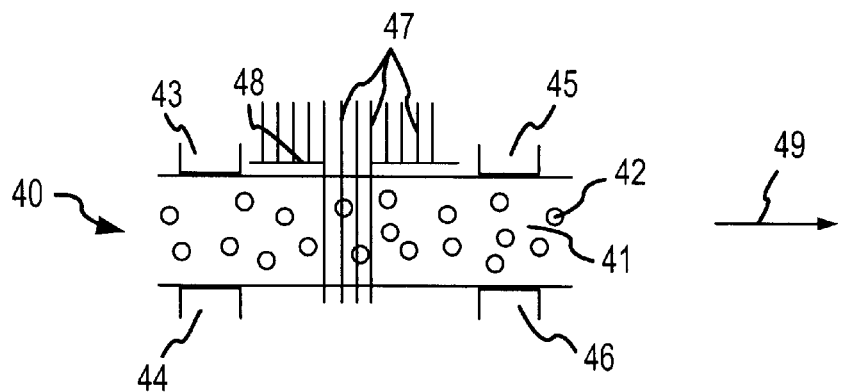

The second PSSE structure 30 in FIG. 3b is also a PDLC structure. In this case, the LC alignment in the droplets 32 is induced by applied lateral electric fields rather than by a physical means such as stretching. As the field direction is orthogonal to conventional applied fields in LCDs, a special driving configuration is required. One way to achieve such an average field distribution throughout the matrix 31 and droplets 32 is to apply a first voltage to electrodes 33 and a second voltage to electrodes 35, thus inducing the proper field alignment in the bulk between electrode pair 34. This applied voltage pattern is alternated with a similar pattern using electrodes 34 and 36 to align the region between electrode pair 35. The pattern is repeated over the entire polarizer area using, for example, sets of interdigitated electrodes on each substrate. While the overhead associated with driving electronics may be undesirable, an effective element is possible using this method.

PSSE structure 40 represents a related approach with no driving requirements. In this example, nematic LC droplets 42 are again formed within polymer matrix 41. An aligning field is applied, but this time by a field generation mechanism external to the assembly. Field poles 43 through 46 represent electrodes, driven in pairs to produce an aligning field of adequate magnitude within the PDLC layer. The region may be immersed in a suitable dielectric fluid if necessary to allow a sufficient field strength to be applied. In the region with uniform lateral field, the induced alignment is locked in via one of several mechanisms. These may include the application of localized UV light 47, masked by aperture 48, provided the LC used is UV-curable. Such polymerizable LC materials exist in the prior art. Alternately, LC/polymer networks have been reported, in which the UV exposure polymerizes a UV-curable monomer dopant to form a sparse network which can effectively maintain an alignment once the field is removed. As yet another option, polymeric LCs exist which can be field aligned when heated above the glass transition, but retain the induced alignment if cooled with the field applied. In this case a heat pulse would be applied in place of the UV exposure. Yet another variation on this method is the use of smectic LC mixtures, which are capable of locking in aligned orientation geometries upon cooling from the nematic to the lower temperature and more ordered smectic phase(s).

The alignment in 40 could alternately be magnetically induced, provided adequate field strength is available. For reasonable droplet sizes and diamagnetic anisotropy, the electrodes 43–46 could be replaced with powerful magnets, aligned such that all magnets have their respective north poles pointed identically to the right or left. Electromagnets could also be readily used. In all of these methods, the relative position of the alignment mechanism would be translated along axis 49 to allow the entire element area to be aligned.

Figure 3D:
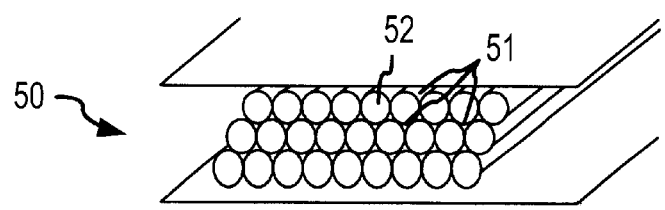

The structure 50 in FIG. 3d depicts another general way in which PSSEs can be constructed. In this case, small diameter birefringent (e.g. drawn or stretched) polymer fibers 52 are wound on a form or otherwise aligned with each other and embedded in a polymer matrix 51. The scattering profile will depend upon the fiber diameter and number of fibers as well as other parameters, but the symmetry is similar to that of element 20. One significant difference is the extended length of the fibers, which alters the symmetry of the scattering. Variations on this approach would include fibers with little or no birefringence (e.g. glass or many polymers) in a birefringent matrix (e.g. polymeric liquid crystal or similar aligned material). This approach can be extended to include three types of domains, where the stretched fibers themselves contain dopant particles or droplets (e.g. glass or LC) having an index match for one polarization but not the other.

Figure 3E:
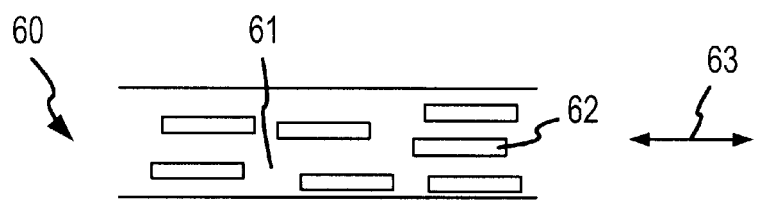

The analogous structure 60 shown in FIG. 3e is similar in form to that described by Land, in which birefringent crystals (or similar particles) 62 are aligned along axis 63 and embedded within a non-birefringent matrix 61. Element 60 could also take the form of a homogeneously aligned polymer such as UV curable LC, polymeric LC or stretched polymer film into which non-birefringent particles such as glass have been embedded.

One advantageous method for manufacturing such an element is to prepare a film having domains of two polymer types. These polymer domains share a common ordinary index and dispersion, but have different or opposite birefringence, preferably high. Birefringence is induced during the film fabrication or processing, such as by extruding, drawing or stretching, with the resulting film having appropriate properties for the present display enhancements.

Figure 3F:
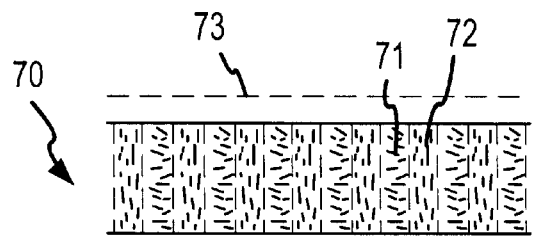

Element 70 in FIG. 3f shows yet another configuration. In this example, the domains in the microstructure are generated from a single material such as UV-curable LC. Alternating domains 72 and 71 are formed by locally polymerizing the separate regions, with a transverse aligning field applied or not applied, respectively. The UV exposure can be done using a scanned laser or by exposure through a mask 73, and the alignment in the absence of the field can be stabilized with standard alignment layer methods.

Figure 3G:
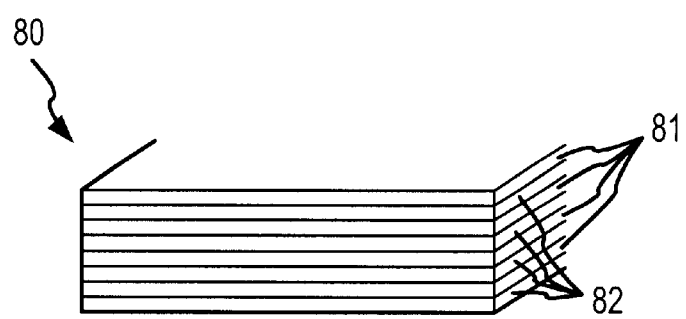

A special case of the PSSE structure is element 80 shown in FIG. 3g. Here comparable materials and physics are involved, but the domains take the form of alternating layers where only one index matches. For example, in the example shown, layers 81 consist of thin sheets of stretched or otherwise birefringent polymer. These are bonded together by adhesive layers 82, where the refractive index of the adhesive matches only one refractive index for the sheets 81. While the result is a specular reflection, for the purposes of this invention we will consider this to be a PSSE due to the structural similarity with the other methods, but with the understanding that the "scattering" is well-defined. The number of layers required for efficient polarization can be quite large, depending upon the birefringence, relative coherence length of the light and angle of incidence.

Figure 3H:
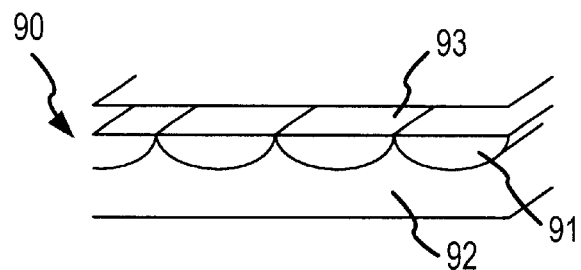

Element 90 shown in FIG. 3h represents another approach to a non-random polarization-sensitive "scatterer". Here, an array of lenses or microlenses 91 (shown as a cylindrical lens, but optionally lenticular in both axes) or other lenticular microstructures is formed from a birefringement material, and preferably index matched between non-birefringent substrates 92 and 93. In the embodiment shown, 91 is constructed from a polymer having high birefringence, with the optic axis of die polymer along the lens axis. The net effect is for each lens 91 to have a focus position which varies with the polarization axis. In addition to variable focusing of the two polarizations, reflections such as total internal reflections at the interfaces can occur. One example of such a structure is an aligned LC material between a flat substrate and a structured substrate. Another fabrication option is the bonding of a stretched, embossed film to a second film, where the lenticular surface is integral to one of the substrates. This example is particularly well suited to lightly scattering (diffuse) configurations where a known diffusion profile is desired.

Numerous variations on the embodiment of FIG. 1 are compatible with the present invention. If the light source contributes little absorptive loss to the cavity, such as would be the case with miniature incandescent lamps, laser diodes or LEDs, full benefit can be taken of the backscattering PSSE 17. The diffuser, if used, can be placed between the PSSE and the display panel provided it is non-depolarizing. Many directionality mechanisms can be used, such as the prismatic Brightness Enhancing Film manufactured by 3M. Alternate diffusers can often be used, as the light backscattered by the pre-polarizer has a tendency to improve the uniformity of the display. Relieving the diffuser of this burden, at least to some extent, can allow a higher transmission diffuser to be used. The result is that by adjusting the system for maximum advantage it is often possible to significantly exceed the direct performance predicted by the simple model in FIG. 3. The PSSE may also be applied directly to a fluorescent lamp, or over one of the currently available flat fluorescent lamps, giving optimum benefit if the lamp surface is very white in appearance.

Figure 4:
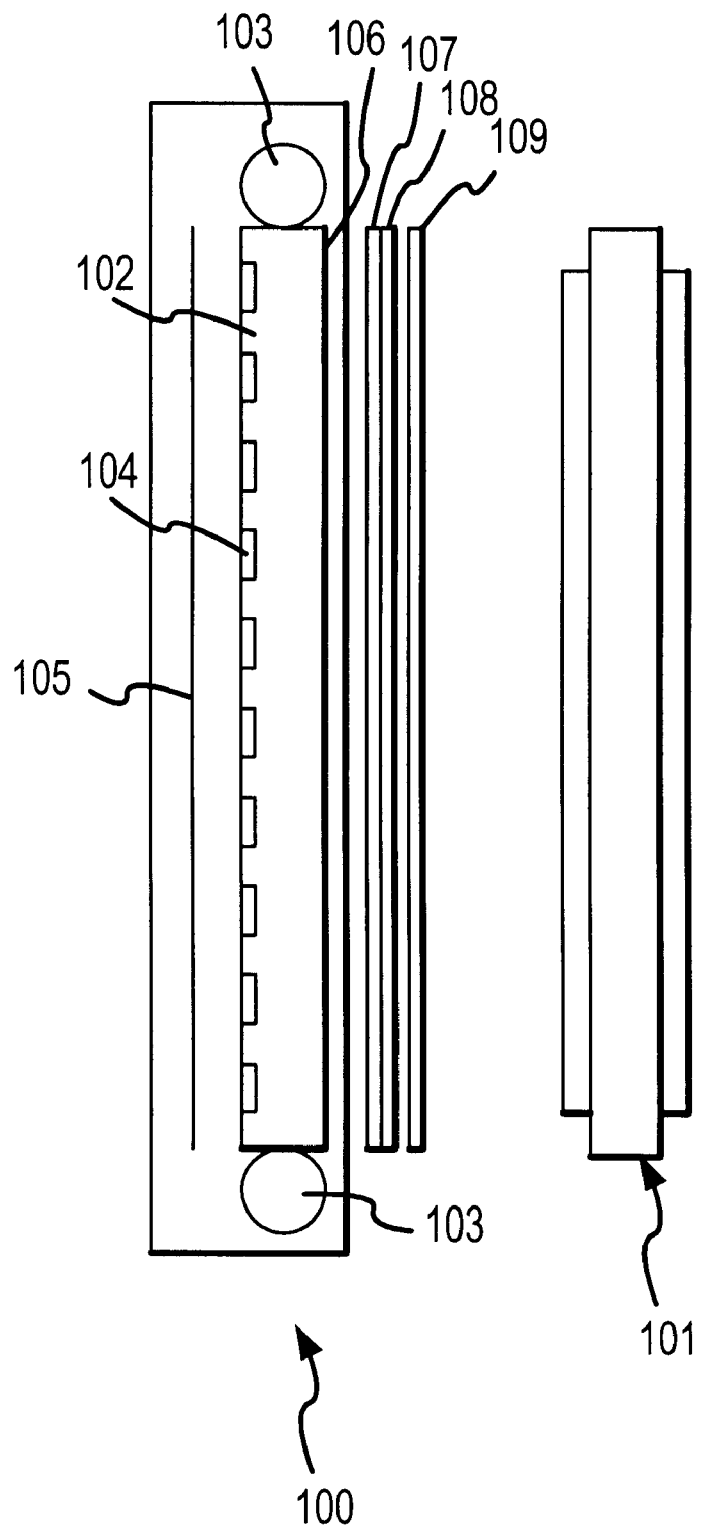
FIG. 4 shows the second embodiment of the invention.

FIG. 4 shows a second embodiment of the present invention. Here, we have incorporated the present invention into a compact backlight configuration such as might be used in a portable computer monitor. Display panel 101, including front and rear polarizers is illuminated by backlight 100, with backscattering PSSE 109 placed between the panel and the effective light cavity of this embodiment. The fluorescent lamps 103 inject light into the ends of light guide 102. The light is contained within 102 by total internal reflection (TIR) except where the TIR is frustrated by diffusing regions 104. These diffusing regions can take numerous forms, all of which effectively scatter or deflect the light such that a portion of it exceeds the angle requirements for TIR. This scattered fight, a portion of which is redirected by mirror 105, exits the light guide 102 through face 106 and passes through diffuser 107 and quarterwave retarder 108 prior to reaching PSSE 109. Retarder 108 is preferably an achromatic quarterwave retarder as is known in the art, and is oriented such that light backscattered or reflected from the PSSE pre-polarizer is converted to circular polarization. In this embodiment, the elements 102, 104, 105 and 107 are all selected so as to be non-depolarizing. Hence, light backscattered by the PSSE is converted to circular polarization by 108, passes through 107, 106, 102 and possibly regions 104 before it reaches mirror 105. Upon reflection by 105, the circular handedness of the polarization is reversed, and is subsequently converted to match the pass-axis of the PSSE by the next pass through retarder 108. In this way, the backscattered light is even more effectively utilized than in the first embodiment, resulting in even higher gains than predicted by the simple model which assumed a fully depolarizing cavity. Additional elements which are not shown may also be retained, such as a directionality inducing element (e.g. lenticular or prismatic array) before or preferably after PSSE 109. If retarder 108 is omitted, other depolarization or polarization rotation means should be provided.

Figure 5:
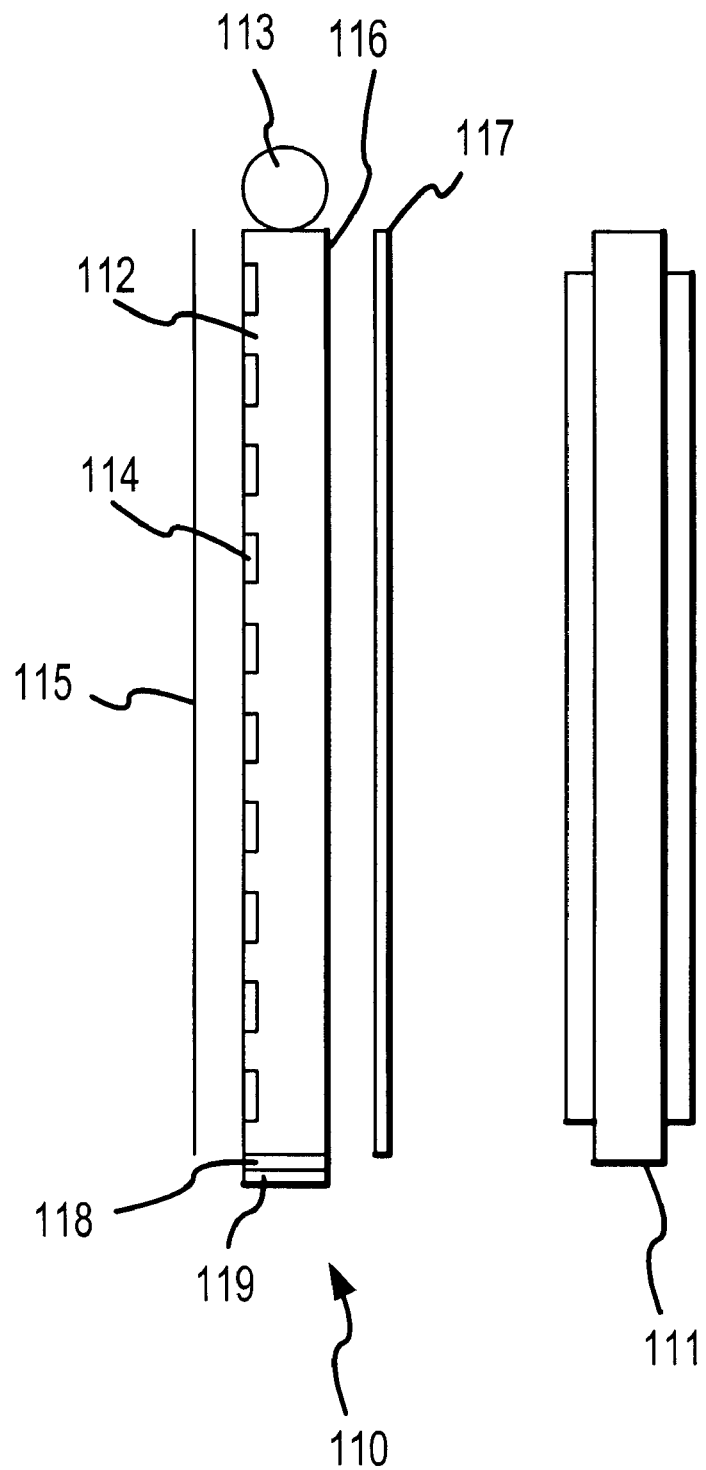
FIG. 5 shows the third embodiment of the invention.

The third embodiment, shown in FIG. 5, utilizes the unique properties of the PSSE in a related but somewhat different way. Here, total internal reflection is the principal mechanism used to turn even a moderately (e.g. forward) scattering PSSE into an effective non-absorbing polarizer, with potential improvement approaching a factor of two improvement even without a strongly backscattering PSSE. Display panel 111, including front and rear polarizers is illuminated by backlight 110. The fluorescent lamp 113 injects unpolarized light into the end of light guide 112. The light is contained within 112 by total internal reflection (TIR) except where the TIR is frustrated by diffusing regions 114. In this embodiment, these diffusing regions take the form of a PSSE index matched for one polarization but not for the orthogonal polarization. The result is that TIR is frustrated for only one selected polarization but not for the other. This substantially linearly polarized scattered light, a portion of which is redirected by mirror 115, exits the light guide 112 through face 116 and passes through polarization preserving diffuser 117 to display panel 111. The axis of the selectively scattered polarization is selected to match the rear polarizer pass axis of display panel 111. Note that this is the reverse of the situation in the previous embodiments. For this reason, there may be a benefit in index matching the extraordinary index in the PSSE 114, rather than the ordinary index as was described in the first PSSE example above. The unscattered polarization remains trapped in the light guide until its polarization is rotated, such as by the quarterwave retarder 118 and mirror 119 at the far end of the light guide. Alternately, other polarization-affecting means could be provided elsewhere in the light guide. Of course, multiple lamps can be used, a highly backscattering PSSE may also be used, and the PSSE need not be at the rear surface. Relevant PSSE configurations include the birefringent fiber and lenticular approaches shown as elements 50 and 90 in FIG. 3, bonded between transparent substrates to form light guide 112.

Figure 6A:
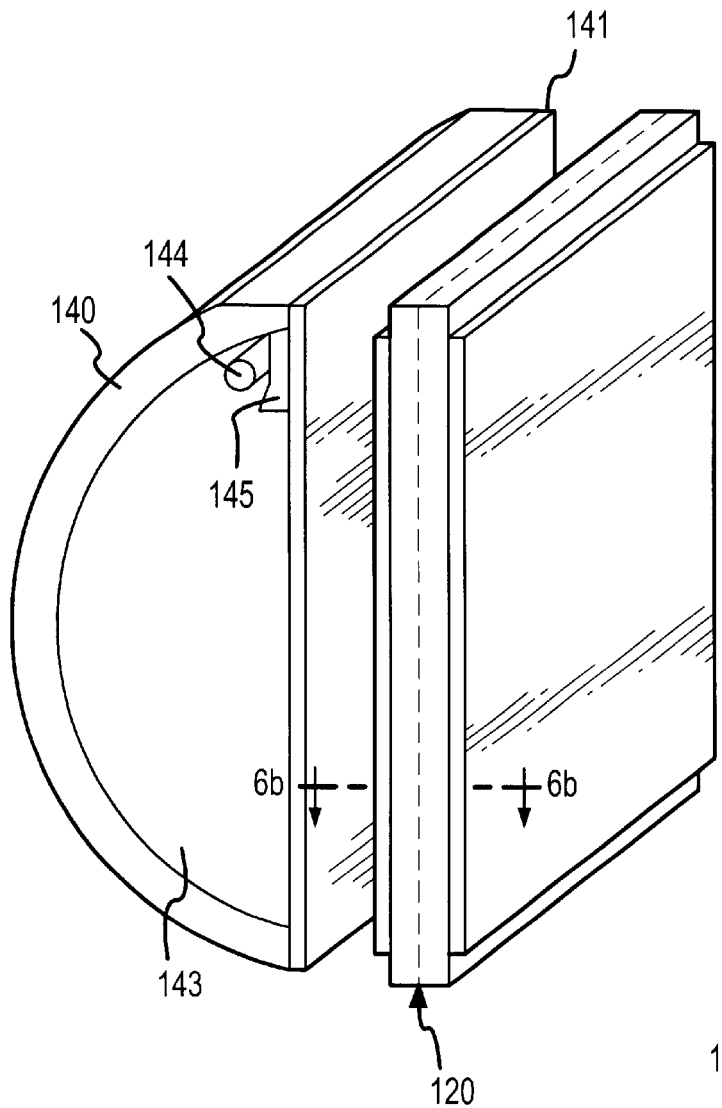
FIGS. 6A–6B shows the fourth embodiment of the invention.

A fourth embodiment of the present invention, shown in FIGS. 6a and b, combines a number of prior art attempts at high flat panel efficiency together with the present method to enable, for the first time, an integrated solution to the LCD efficiency problem. With typical color AMLCD transmittances on the order of 3%, it is readily seen from the simple model presented earlier that an order of magnitude improvement could be achieved if the equivalent black area for the cavity and panel together were reduced by approximately a factor of 10. In the absence of the present invention, this was not possible, since no effective method was known for recapturing the polarization loss in a diffusely backlit display of this type. Thus, the best that could have been obtained would be a loss area equivalent to more than half the panel size. Thus, the effectiveness of all prior art efficiency enhancement methods were, before now, severely constrained. The present invention serves as an enabling method by which the full benefit of the entire set of methods can be achieved. These prior art methods may be used individually in conjunction with the present invention, or in combination, such as in the configuration of FIG. 6.

Figure 6B:
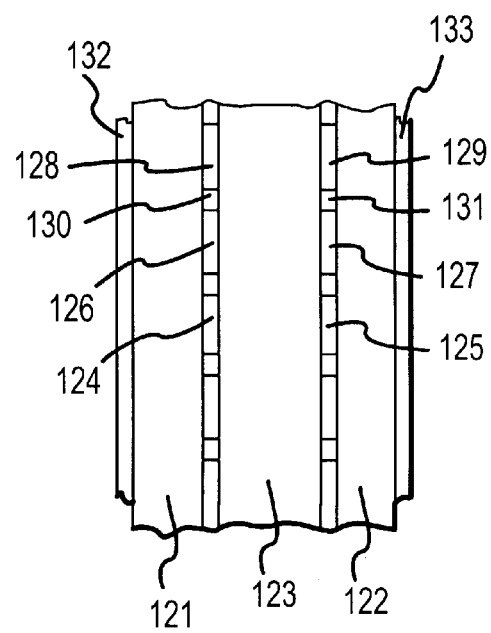

In the embodiment of FIGS. 6a, light box 140 is constructed of a curved interior wall 143 and two end walls (not shown). These are made from materials having very high diffuse reflectance, such as Spectralon (available from Labsphere). A low absorption light source 144, for example a fluorescent lamp or a set of incandescent bulbs, is positioned behind light block 145, such that the interior surfaces are relatively uniformly illuminated, but 144 is not directly visible when viewed through the port of the cavity. Backscattering pre-polarizing element 141 is, for example, a PSSE with enhanced backscattering as described earlier, serving to efficiently return the unwanted polarization to the backlight cavity while passing the desired polarization to polarized display panel 120. The expanded view shows how the total reflectance of the pre-polarizer and display panel are increased even further. As shown in the cross section of FIG. 6b, 120 is a color AMLCD, with liquid crystal material 123 situated between parallel transparent substrates 121 and 122. Color is provided by filtering adjacent regions of the display panel with red, green and blue absorbing filters 125, 127 and 129, respectively as shown. To decrease the absorption of light by these filters, reflective color prefilters 124, 126 and 128 are situated between the absorbing color filter means and the backlight. While the filters are shown as being on opposite substrates in this embodiment, they could certainly be configured together on either substrate. Each reflective color filter, constructed for example in the form of a multilayer dielectric filter as is well-known in the art, passes the desired spectral components for that area over the required viewing angle, while returning as much of the unused spectral range as possible. For example, reflective filter 124, corresponding to red absorbing filter 125, transmits red while reflecting green and blue. Similarly, 126 passes green while reflecting red and blue, and 128 passes blue while reflecting green and red. The pass band of each filter can be extended on the long wavelength side to accommodate wide viewing angles if necessary. Further, the region between the active matrix pixels are covered by backreflector 130 on the rear side as well as black matrix 131 on the front side. The display is made complete by the addition of efficient rear and front polarizers 132 and 133, as well as the active matrix addressing structure which is not shown. This configuration maximizes the amount of light returned to the cavity. The effectiveness of these prior art methods such as the reflective color filters is significantly enhanced by the present invention. For example, in the prior art the maximum reflectance of an ideal red color dot could be as high as 33%, representing the return of ⅔ of the light (green and blue, but not red), as well as the 50% attenuation by the absorbing polarizer. Addition of the pre-polarizer allows this ideal reflectance to be 83% (the same 33% plus the 50% returned by the pre-polarizer), with a correspondingly significant potential for efficiency improvement.

While the absorbing elements 125, 127, 129, 131 and 132 are included in this embodiment for performance, these may certainly be eliminated if unneeded due to restricted viewing angles or low front illumination such as head mounted or projection applications. Also, a diffuser could be added if necessary to ensure uniformity, and directionality control elements may be added as well, increasing the total reflectance of the port even further.

The polarization control of the diffusely backlit embodiments of this invention inherently increase the uniformity of these systems. This uniformity enhancement can be traded for even further efficiency gains by increasing the diffuse transmittance of the traditional diffuser element, even up to the point of having no diffuser such as in FIG. 6. Even greater uniformity enhancement can be provided by using additional polarization control in the backlight cavity.

Figure 7:
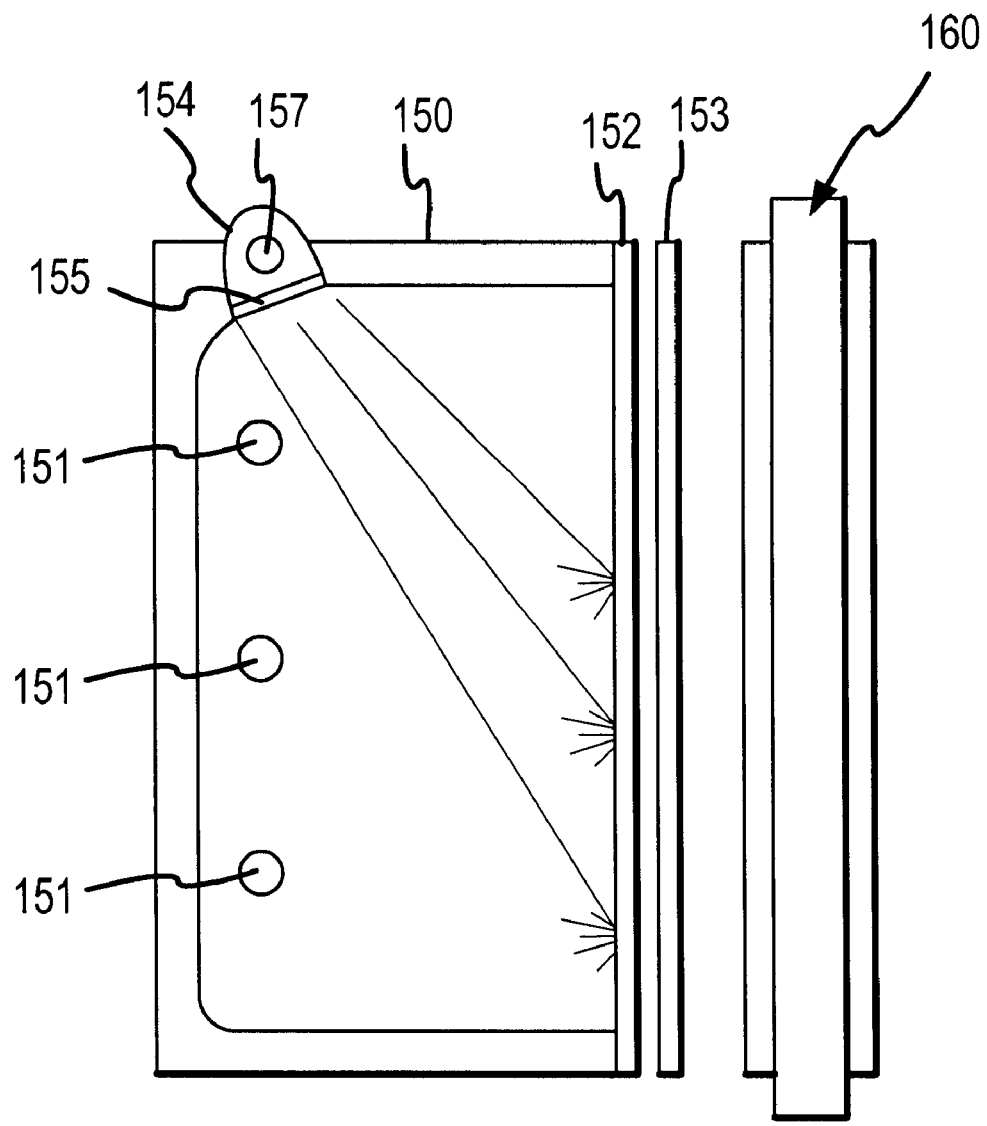
FIG. 7 shows the fifth embodiment of the invention.

FIG. 7 shows a fifth embodiments wherein even greater uniformity enhancement is provided by the use of additional polarization control mechanisms. Light box 150 contains lamps 151 and has its port covered by PSSE pre-polarizer 152 and diffuser 153 (preferably non-depolarizing), providing backlight illumination for display panel 160, including front and rear polarizers. This configuration supports high brightness applications, allowing efficient use of relatively large fluorescent lamps, for example. Optimizing the efficiency of this system implies having just enough diffusion in 153 to give the necessary uniformity. A supplemental lamp 157 is used to provide light under alternate lighting conditions, for example at night when very low luminance is required, or if spectral restrictions apply. In this case, the illumination from lamp 157 is pre-polarized prior to entering the main cavity. In the embodiment shown, this is done by placing 157 into a separate cavity 154 and partially polarizing it with backscattering PSSE 155. This polarization could alternately be achieved by other means, such as using an inherently polarized source, or using an absorbing polarizer in place of 155. The axis of 155 is oriented so as to be crossed with the axis of pre-polarizer 152. The net effect is to provide very high diffusion (obscuration) for direct viewing of the supplemental lamp 157, but low diffusion for the display pass-axis polarization in all other cases, including indirect (and therefore more uniform) light from the supplemental lamp. The level of polarization provided by 155 may be selected so as to provide maximum uniformity, so that the area of the supplemental lamp is neither too bright or too dark. In this way, we have designed a cavity which is optimized for efficiency in the high brightness mode and simultaneously optimized for uniformity in the alternate lighting mode, and in a way in which the supplemental lamp does not interfere significantly with the efficiency of the high brightness mode.

Figure 8:
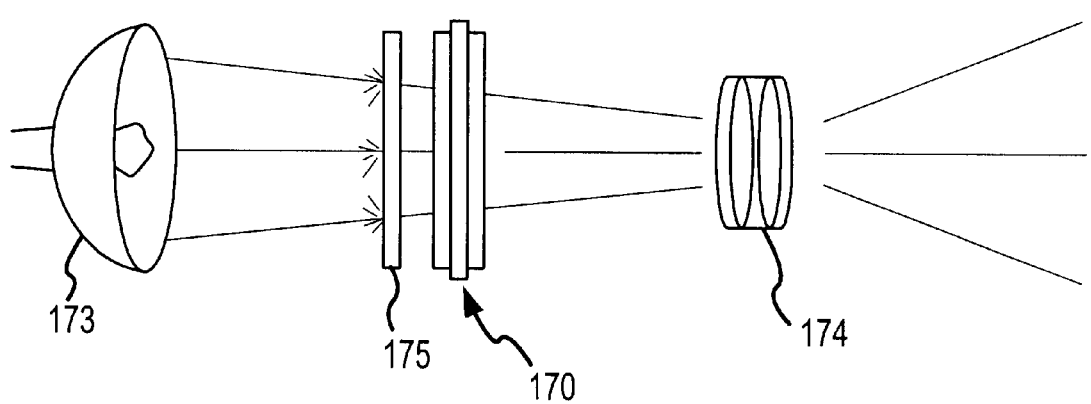
FIG. 8 shows the sixth embodiment of the invention.

A sixth embodiment of the present invention is shown in FIG. 8. Here, a strongly backscattering polarization sensitive scattering element is used as a pre-polarizer in a high power projection system, such as a slide projector system or other single display panel projector. Polarized light valve 170, having front and rear absorbing polarizers, is illuminated by high intensity light source 173. The light modulated and passed by the light valve is projected by optics 174 onto a screen (not shown). Pre-polarizer 175 is positioned between the light source and the display panel, and serves to greatly reduce the amount of light absorbed by the rear polarizer of the display panel. The pre-polarizer is preferably a PSSE optimized for significant backscatter as described earlier, although less backscatter is necessary if the distance between 175 and 170 is made larger. While this embodiment does not provide any significant recapture of the excluded polarization, it does allow indirect luminance improvement in that higher power light sources and potentially more efficient polarizers may be used. At the very least, reduction of the display heating will improve reliability. This approach has clear advantages over the prior art in that it is flat, artifact free, and relatively achromatic, and has virtually no absorption, is easily inserted into the optical path, can have very high transmission, and further diffuses the undesired polarization broadly, minimizing thermal concerns in nearby components.

Figure 9:
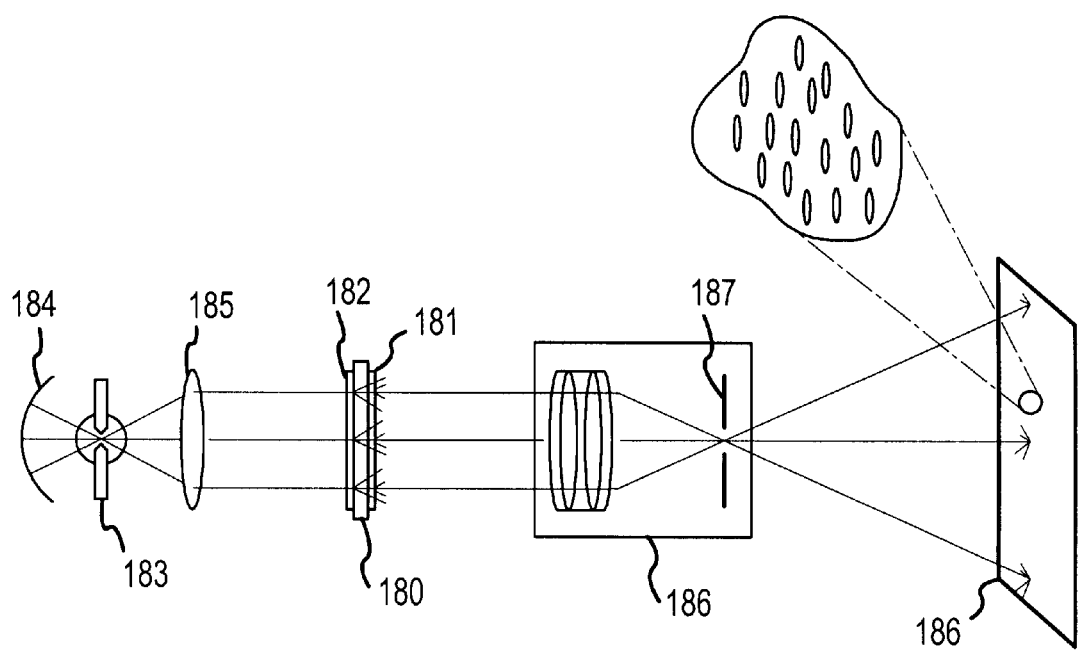
FIG. 9 shows the seventh embodiment of the invention.

A seventh embodiment, shown in FIG. 9 uses the polarization management methods of the present invention to even greater advantage in a polarized projection display. Here, the display panel 180 is illuminated by lamp 183, reflector 184 and lens 185. Heating of the light valve is reduced by replacing one or, in this embodiment, both of the display polarizers 181 and 182 with PSSEs. Projection optics 186 are used to image the display panel onto screen 188. Projection optics 186 include an effective aperture 187 which excludes the majority of light scattered by one or both of the PSSEs 181 and 182. In this way, the only light absorbed by the display panel is that absorbed by the light valve matrix structure itself.

Both of the sixth and seventh embodiments are readily adapted to multiple-panel projectors such as are often used to provide full-color performance. The effectiveness of the scattering projection display polarizers taught here are dependent upon the separation between them and the other elements such as the projection lens aperture.

FIG. 9 also depicts yet a further feature of the seventh embodiment. To maximize the efficiency and at the same time maintain high contrast, high resolution and very wide viewing angle in the front projection screen shown, a backscattering PSSE is used as the screen 188. This affords rather high diffuse reflectance, provided the projected polarization matches the scattering axis of the screen. Yet, the reflection for ambient light is reduced dramatically by allowing one polarization to pass through the PSSE, possibly to a black backing (not shown). The horizontal viewing angle is by nature very wide, and resolution is kept high by keeping the layer relatively thin. The amount of scattering in the vertical axis can be controlled by surface texture, or by controlling the length scale of the droplets or other refractive index variation in the vertical axis. Similar structures can be used for rear projection screens, overcoming many of the difficulties associated with lenticular approaches at high projected resolution, and in this case strong backscattering would not be required.

Figure 10:
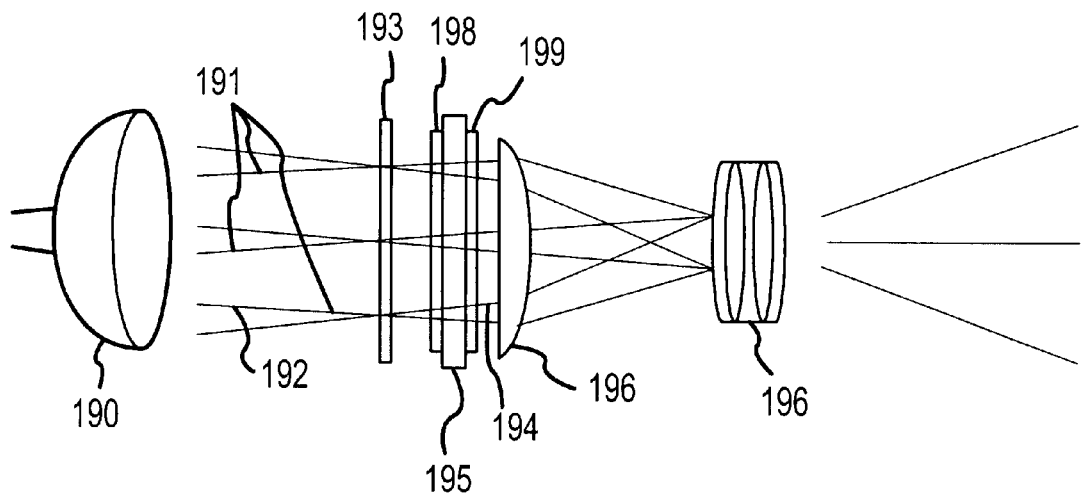
FIG. 10 shows the eighth embodiment of the invention.

An eighth embodiment is shown in FIG. 10. This embodiment goes one step further than previous projection display embodiments in that it provides polarization conversion (recapture) for directional light in addition to reducing the power absorbed by the absorbing display polarizer. Light source 190 is a source of collimated or partially collimated rays 191, having a cone angle or divergence of angle 192. These rays are incident on polarization converter 193, which converts unpolarized light into predominantly polarized light with little loss. As is well understood from prior art polarization conversion schemes for projection displays, effective polarization conversion implies either a broadening of the divergence angle or an increase in the cross-sectional size of the illumination beam, or both. In the present case, polarization converter 193 broadens the divergence angle from angle 192 to angle 194 in at least one axis. This largely polarized fight then illuminates polarized light valve 195, with the output polarization of 193 matching the pass-axis of the rear polarizer 198. After passing through front polarizier 199, the modulated light is then projected by optics 196 onto a screen, not shown, or for direct viewing such as with a collimated head mounted display. To obtain the maximum efficiency benefit, optics 196 provide sufficient collection angle to include the majority of the rays modulated by the light valve.

Figure 11:
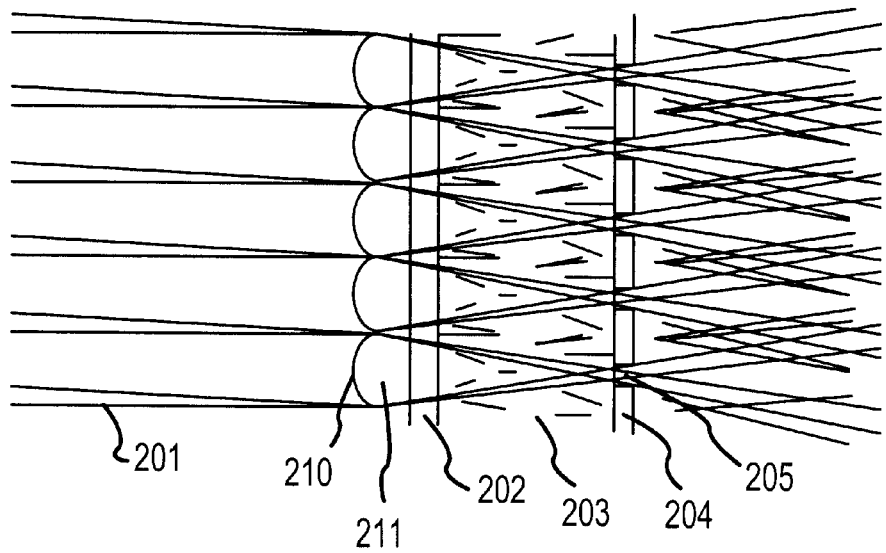
FIG. 11 shows a close up view of the polarization converter.

The expanded view of element 193 in FIG. 11 shows how the present invention is configured in this embodiment. The directional light 201 is incident on lenticular surface 210 of substrate 211. This substrate is bonded to substrate 203 with an intervening PSSE layer 202, said PSSE layer being only lightly forward scattering, being constructed as described earlier. Rays which are passed by the PSSE without being scattered pass through the holes 205 in half-wave retarder 204, said holes being located where the rays are focused by the individual lenslets. Most of the rays which are of the orthogonal polarization and which are forwad-scattered miss the holes and pass through the half-wave retarder 204, and are rotated to be the same polarization as the focused rays. The conversion efficiency can be quite high, depending upon the f-number and optical quality of the lenslets and the degree of incoming collimation, as well as the level of reflection losses through the element. Numerous alternative forms are readily envisioned, such as the inclusion of a polarization preserving diffuser between 203 and 204, as might be required in a collimated display application. Numerous lenslet and retarder structures can be used, including additional lenslets after the retarder. A lenticular PSSE structure, such as element 90 in FIG. 3h, could double as both the lenticular structure and the polarization sensitive element by only focusing one polarization and not the other.

As with the other embodiments, the PSSE does not by itself provide an effective polarizing mechanism. Here again, the polarization is achieved by combining the PSSE with a suitable and novel aperture mechanism.

Figure 12:
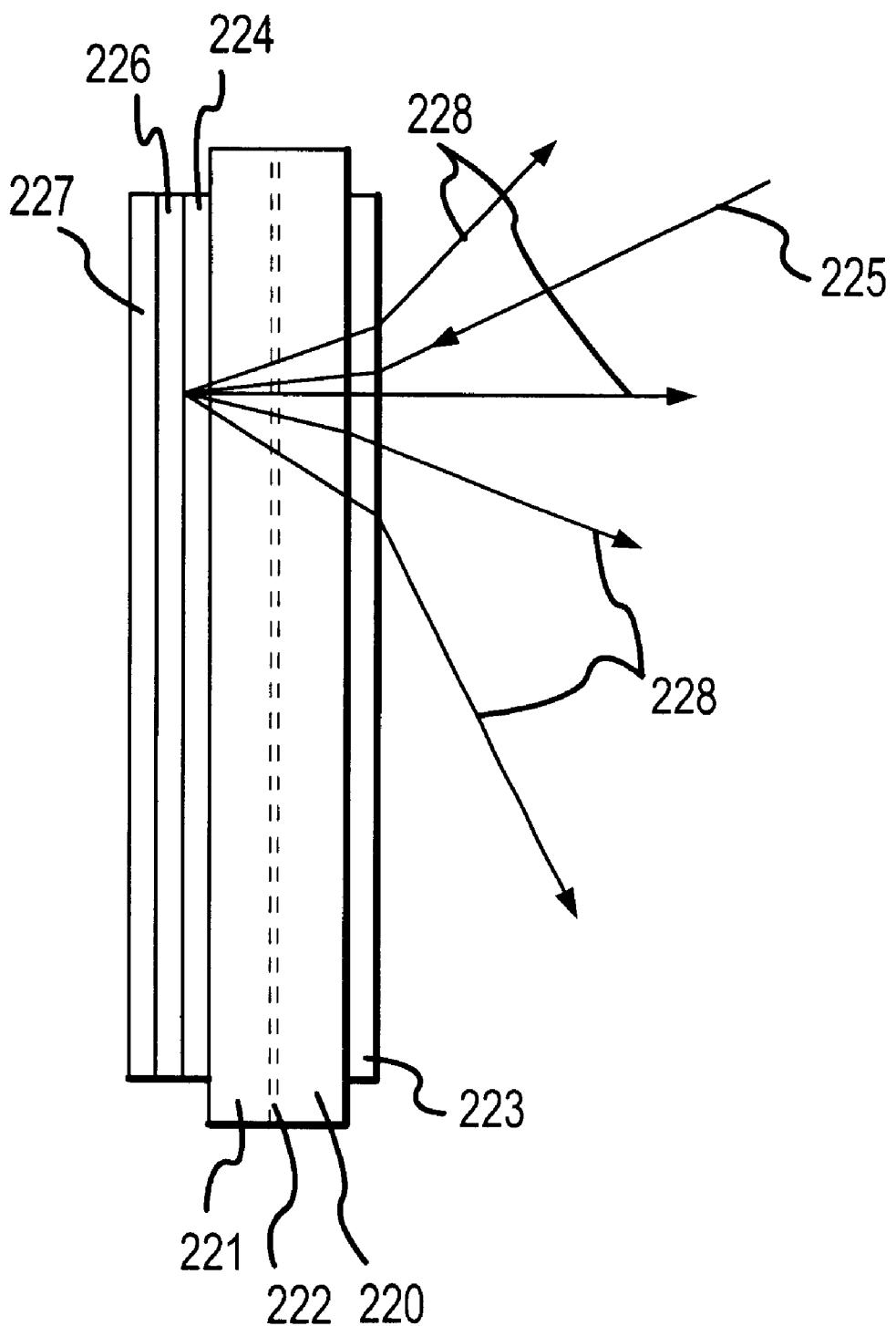
FIG. 12 shows the ninth embodiment of the invention.

A ninth embodiment of the present invention, FIG. 12, illustrates how the unique polarization control offered by the PSSE may be applied to enhance the efficiency and performance of reflective LCDs, such as common segmented displays, where ambient light is used as the light source. In this simple example, an LCD consisting of front and rear transparent substrates 220 and 221, LC layer 222 and electrical addressing structures not shown, is illuminated by front light rays, such as ray 225. Modulation of the light is accomplished by selective modification of the polarization state of the rays in the presence of front and rear absorbing polarizers 223 and 224. In conventional displays of this type, the reflector situated behind the rear polarizer is either polarization-preserving or fully diffuse, but not both. In this embodiment, a PSSE 226 is placed behind the rear polarizer, and is followed by a mirror 227 (necessary only if the PSSE is not highly backscattering). The scattering axis of the PSSE is aligned with the pass axis of 224. This provides the highly diffuse scattering profile desirable in many applications without introducing the losses associated with depolarization, as the PSSE retains the polarization quite well. Given a PSSE with sufficient backscattering efficiency, the elements 224 and 227 can be eliminated, and a black layer placed behind 226 to absorb the unwanted polarization. While similar in some ways to prior art wire grid polarizer methods for reflective displays, this approach has considerable advantages for the direct view case due to its diffuse reflectance profile and high efficiency.

The foregoing is a description of a novel and nonobvious High Efficiency Polarized Display method. The applicant does not intend to limit the invention through the foregoing description, but instead define the invention through the claims appended hereto.

I claim:

1. A polarizer, comprising:
   a polarization-sensitive scattering element (PSSE), wherein said PSSE is a microstructural composite of material domains having differing birefringence and having a first scattering distribution for light rays of a first polarization and a second scattering distribution for light rays of a second polarization, wherein the first scattering distribution is such that the majority of the light rays of the first polarization are randomly backscattered.

2. The polarizer of claim 1, wherein the second scattering distribution is such that the light rays of the second polarization are substantially non-scattered.

3. The polatizer of claim 1, wherein the PSSE is a uniaxial homogeneously-aligned structure form from droplets made of liquid crystal embedded in polymer matrix, the droplets being physically stretched along a common axis, and refractive indices of the liquid crystal being selected such that either one of the ordinary index or extraordinary index of the liquid crystal matches the corresponding index of the polymer matrix.

4. The polarizer of claim 1, wherein the PSSE is a uniaxial homogeneously-aligned polymer dispered liquid crystal (PDLC) structure is back scattering for the first polarization.

5. The polarizer of claim 4, wherein the PDLC structure is formed from liquid crystal droplets aligned in a common direction by application of an electric field.

6. The polarizer of claim 4, wherein the PDLC structure is formed from liquid crystal droplets aligned in a common direction by application of an electro-magnetic field.

7. The polarizer of claim 4, wherein the PSSE is comprised of fibers aligned and embedded in a matrix, wherein the scattering profile of the PSSE is dependent upon the material refractive indexes, fiber diameter, and number of fibers.

8. The polarizer of claim 4, wherein the PSSE is comprised of a plurality of birefringement crystals aligned along an optical axis and embedded within a non-birefringement matrix.

9. The polarizer of claim 4, wherein a portion of the material domains are substantially non-birefringement.

10. The polarizer of claim 4, wherein the PSSE is a PDLC structure in which the liquid crystalline domains have been polymerized with an aligned orientation.

11. The polarizer of claim 1, wherein the PSSE is substantially backscattering for the first polarization and substantially transparent for a polarization orthogonal to the backscattering polarization.

12. The polarizer of claim 1, wherein the second scattering distribution is such that the majority of the light rays of the first polarization are transmitted.

13. The polarizer of claim 1, wherein the composite is comprised of at least two polymer types.

14. The polarizer of claim 1, wherein a portion of the material domains are substantially birefringent.

15. A polarization-sensitive scattering element (PSSE), comprising a microstructural composite of material domains having differing birefringence and having a first scattering distribution for light rays of a first polarization and a second scattering distribution for light rays of a second polarization, wherein the first scattering distribution is such that the light rays of the first polarization are randomly backscattered, and wherein the PSSE is comprised of fibers aligned and embedded in a matrix, wherein the scattering profile of the backscattered light is dependent upon the material refractive indexes, fiber diameter, and number of fibers.

16. A polarization-sensitive scattering element (PSSE), comprising a microstructural composite of material domains having differing birefringence and having a first scattering distribution for light rays of a first polarization and a second scattering distribution for light rays of a second polarization, wherein the first scattering distribution is such that the light rays of the first polarization are randomly diffuse, and wherein the PSSE is comprised of liquid crystal with alternating domains contained within, formed by locally polymerizing separate regions with a transverse aligning field selectively applied.

17. A backscattering diffuse polarizer, comprising a polarization-sensitive scattering element (PSSE), wherein said PSSE is a microstructural composite of material domains having differing birefringence, wherein the PSSE has a thickness and a difference in birefringence that are sufficient to randomly backscatter a majority of the light of a first polarization.

18. A polarization-sensitive scattering element (PSSE), comprising domains of a first polymer type and a second polymer type having birefringence, wherein a first refractive index of said domains of the first polymer type matches a second refractive index of said domains of the second polymer type, the birefringence of said domains of the first polymer type is different from the birefringence of said domains of the second polymer type such that a majority of light of a first polarization is backscattered and such that a majority of light of a second polarization is transmitted.

* * * * *